United States Patent
Legerton et al.

(10) Patent No.: US 11,221,498 B2
(45) Date of Patent: *Jan. 11, 2022

(54) CONTACT LENS AND METHOD AND SYSTEMS FOR CONSTRUCTING A CONTACT LENS

(71) Applicant: Innovega, Inc., Bellevue, WA (US)

(72) Inventors: Jerome A. Legerton, Jupiter, FL (US); Jay P. Marsh, Perris, CA (US); William E. Meyers, Scottsdale, AZ (US); Arthur Yasheng Zhang, San Diego, CA (US)

(73) Assignee: Innovega, Inc., Bellevue, WA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/355,436

(22) Filed: Mar. 15, 2019

(65) Prior Publication Data

US 2019/0346691 A1  Nov. 14, 2019

Related U.S. Application Data

(63) Continuation of application No. 14/878,475, filed on Oct. 8, 2015, now Pat. No. 10,261,342.

(51) Int. Cl.
*G02C 7/04* (2006.01)
*G01B 21/08* (2006.01)

(52) U.S. Cl.
CPC ............... *G02C 7/04* (2013.01); *G01B 21/08* (2013.01); *G02C 7/049* (2013.01)

(58) Field of Classification Search
CPC . G02C 7/04; G02C 7/08; G02C 7/021; G02C 7/047–049; G02C 7/083;
(Continued)

(56) References Cited

U.S. PATENT DOCUMENTS 4,327,202 A * 4/1982 Foley, Jr. .......... C08F 222/1006
                                                          526/245
9,341,864 B2 * 5/2016 de Juan, Jr. ............ G02C 7/047
(Continued)

OTHER PUBLICATIONS

Kennedy RH, Bourne WM, Dyer JA. "A 48-year clinical and epidemiologic study of keratoconus," American Journal of Ophthalmology, 1986;101:267-273.
(Continued)

*Primary Examiner* — Mustak Choudhury
(74) *Attorney, Agent, or Firm* — Sheppard Mullin Richter & Hampton LLP

(57) ABSTRACT

Contact lenses, methods and systems for accomplishing the requirement for biocompatibility of oxygen delivery to the eye, and the cornea in particular, when elements and components are used which reduce the transmissibility of oxygen and which require coverage of a significant area of the non-vascularized cornea. A contact lens assembly is provided, comprising: an anterior surface, a posterior surface and at least one element or component having a substantially low oxygen permeability disposed within the lens. The contact lens also includes a layer having an oxygen permeability greater than the aforementioned element or component. The thickness of this layer is such that the layer provides an equivalent oxygen percentage to the cornea beneath the aforementioned element or component.

21 Claims, 3 Drawing Sheets

(58) Field of Classification Search
CPC .... G02C 7/085; G02C 7/101; G02C 2202/04; G02C 2202/16; G02B 1/043; G02B 3/00; G02B 27/017; G02B 27/0172; G01B 21/08; G02F 1/133371; G02F 1/133553; G02F 1/134309; G02F 1/29; A61F 2/1605; A61F 2/1613; A61F 2/1627; B29D 11/00048; B29D 11/00067; B29D 11/00817; B29D 11/00826
See application file for complete search history.

(56) References Cited

U.S. PATENT DOCUMENTS

| | | | |
|---|---|---|---|
| 2004/0027536 A1* | 2/2004 | Blum | G02F 1/133371 351/159.03 |
| 2005/0237480 A1* | 10/2005 | Allbritton | C08J 7/18 351/159.01 |
| 2007/0291224 A1* | 12/2007 | Lai | B29D 11/00048 351/159.02 |
| 2010/0238398 A1* | 9/2010 | Nicolson | C08G 18/8116 351/159.33 |
| 2012/0026458 A1* | 2/2012 | Qiu | G02B 1/18 351/159.33 |
| 2014/0362339 A1* | 12/2014 | Imafuku | C08F 220/36 351/159.33 |
| 2015/0234204 A1* | 8/2015 | Havenstrite | A61B 5/01 351/159.33 |

OTHER PUBLICATIONS

Korb DR, Finnemore VM, Herman JP. "Apical changes and scarring in keratoconus as related to contact lens fitting techniques," Journal of the American Optometric Association, 1982;53: 199-205.
Maguen E, Espinosa G, Rosner IR, Newburn AB. "Long-term wear of Polycon contact lenses in keratoconus," The CLAO Journal, 1983;9:57-59.
Drews MJ, Driebe WT, Stern GA. "The clinical management of keratoconus: a 6-year retrospective study," The CLAO Journal, 1994;20:194-197.
Smiddy WE, Hamburg TR, Kracher GP, Stark WJ. "Keratoconus: contact lens or keratoplasty?" Ophthalmology 1, 988;96 :487-492.
Westerhout, D. "The combination lens," Contact Lens, 1973;4(5):3-9.
Baldone JA. "The fitting of hard lenses onto soft contact lenses in certain diseased conditions," Contact Lens Medical Bulletin, 1973; 6(2-3): 15-17.
Weissman BA. "An old-new piggyback fit," Contact Lens Forum, 1982;7(3):71-73.
Brennan NA. "Current thoughts on the etiology of ocular changes during contact lens wear," Australian Journal of Optometry, 1985;68(1):8-24.
Hill RM, Fatt I. "Oxygen uptake from a reservoir of limited vol. of the human cornea in vivo," Science, 1963;142:1295-1297.
Hill RM. Cuklanz H. "Oxygen transmissivity of membranes in contact with the cornea: physiological observations," British Journal of Physiological Optics, 1967;24(3):206-216.
Fink BA, Smith BJ, Hill RM. "Oxygen depletion characteristic of in vivo human cornea [ARVO Abstract]," Investigative Ophthalmology & Visual Science, 1995;36(4):5310.
Hill RM, Fatt I. "Oxygen deprivation of the cornea by contact lenses and lid closure," American Journal of Optometry Amer Academy Optometry, 1964;41(1 1):678-687.
Fink BA, Hill RN/I, Carney LG. "Influence of rigid contact lens base curve radius on tear pump efficiency," Optometry & Vision Science, 1992;69:60-5.
Fink BA, Hill RN/I, Carney LG. "Influence of rigid contact lens overall and optic zone diameters on tear pump efficiency," Optometry & Vision Science, 1990;67:641-4.
Fink BA, Carney LG, Hill RM. "Rigid contact lens design: effects of overall diameter changes on tear pump efficiency," Optometry & Vision Science, 1991;68:198-203.
Fink BA, Carney LG, Hill RM. "Rigid lens tear pump efficiency: effects of overall diameter/base curve combinations," Optometry & Vision Science, 1991;68:309-313.
Fink BA, Hill RM, Carney LG. "Effects of rigid contact lens edge lift changes on tear pump efficiency," Optometry & Vision Science, 1991;68:409-13.
Fink BA, Carney LG, Hill RM. "Influence of power changes in single cut rigid contact lenses on tear pump efficiency," Optometry & Vision Science, 1992;69:691-7.
Hill RIVI, Szczotka LB. "Hypoxic stress units: another look at oxygen performance of RGP lenses on the cornea," Contact Lens Spectrum, 1991;6(4):31-3.
Ostrem ED, Fink BA, Hill RM. "Contact lens transmissibility: effects on delivery of oxygen to the cornea," Optometry & Vision Science, 1996;73:159-63.
Fink BA, Hill RIVI, Smith B, Szczotka L, Barr JT. "RGP materials that reduce hypoxic stress: Part II," Contact Lens Spectrum, 1992;7(4):20-1.
Hill RM. "Aqualunging: or the lens reservoir effect," International Contact Lens Clinic, 198 1;8(6):30-35.
Fink BA, Hill RM, Pappas C. "Dk!L: effect on the post-lens reservoir [ARVO Abstract]," Investigative Ophthalmology & Visual Science, 1999;40(4):5906. Abstract #4775.
Holden BA, Mertz GW. "Critical oxygen levels to avoid corneal edema and daily and extended wear contact lenses," Investigative Ophthalmology & Visual Science, 25:1161-1167,1984.
Trial Registration, clinicaltrials.gov, Identifier: NCT00212134.

* cited by examiner

CONTACT LENS AND METHOD AND SYSTEMS FOR CONSTRUCTING A CONTACT LENS

CROSS REFERENCE TO RELATED APPLICATIONS

This claims the benefit of U.S. patent application Ser. No. 14/878,475 filed on Oct. 8, 2015, which in turn claims the benefit of U.S. Prov. Pat. App. Nos. 62/061,270 and 62/063,490 filed on Oct. 8, 2014 and Oct. 14, 2014, respectively, the entireties of which are hereby incorporated by reference.

BACKGROUND OF THE INVENTION

Field of the Invention

This invention relates to the general field of contact lenses, and more specifically toward a contact lens having at least one element or component with a property rendering low or no gas permeability while at the same time delivering a minimum amount of oxygen to the cornea of an eye wearing the contact lens.

The earliest reference to eyeborne optics is credited to Leonardo DaVinci for his envisioning of the value of placing optics on the eye. The first application was with glass scleral shells nearly 400 years later. The advent of plastics, particularly polymethylmethacrylate (PMMA) launched the era of corneal contact lenses wherein the material made contact with the cornea only. PMMA was characterized as having no gas permeability. Lenses required designs that allowed for fluid exchange behind the lens for oxygen delivery to the cornea. The decade of the 1970's became a period of development of gas permeable rigid polymers for corneal contact lenses. Lens designs were modified to a closer lens-eye relationship with resultant improvement of lens comfort. The modal amount of clearance and movement for non-gas permeable lenses could be decreased as the gas permeability of materials and the resultant oxygen transmissibility increased.

Gas permeability or more relevant to this discussion, oxygen permeability is mathematically described using the coefficient Dk, where D being diffusivity ($cm^2$/sec), a measure of how fast the oxygen moves through the material, and k being the solubility (ml $O^2$/ml of material×mm Hg), a measure of how much oxygen is contained in the material. The coefficient of oxygen transmissibility (Dk/t or Dk/L) is derived by dividing the oxygen permeability of a material by the thickness of the material in millimeters.

The wearing of contact lenses can cause physiological and even pathological ocular changes to occur. These changes involve both ocular structure and function, and hypoxia has been implicated in their etiologies. Normal corneal metabolism and physiological function are maintained only with an adequate supply of oxygen. Contact lens parameters are important in determining the oxygen tension between the cornea and the contact lens and whether or not the cornea is being supplied adequate amounts of oxygen during the wearing of these lenses. While wearing a rigid contact lens, there are two ways in which oxygen can be delivered to the cornea: transmission through the lens material itself or through the pumping of tears (bulk-flow volume exchange and stirring) beneath the contact lens during blinking Rigid contact lenses can be manufactured in a variety of designs to achieve appropriate centration, movement, and tear exchange.

In order to determine how well the cornea is securing oxygen during contact lens wearing, a Clark-type polarographic oxygen electrode can be used. Hill and Fatt made the first in vivo measurement of oxygen consumption from the atmosphere by the human cornea in 1963. This technique has revealed an increase in epithelial oxygen uptake rate after disruption of the anterior (atmospheric) oxygen supply. This increased oxygen uptake rate is greater if a contact lens is impermeable to oxygen or if it is worn statically (without blinking) The measurement of corneal oxygen uptake can be used to indicate a reduction of oxygen reaching its epithelial surface, reflected as an increase in oxygen uptake rate. Differences (reductions) in oxygen uptake rates measured between static (without blinking) and dynamic (with blinking) conditions provide a measure of tear pump efficiency.

In 1995, Fink, Smith, and Hill measured corneal oxygen uptake rates on twelve human subjects following eleven deprivation intervals, ranging from 0 to 300 seconds in 30 second steps. The oxygen deprivation was induced by the static wearing of polymethylmethacrylate (PMMA) contact lenses, which are impermeable to oxygen. It was found that the human cornea, when stressed by a reduction in oxygen availability, demonstrates two modes of oxygen uptake. The oxygen uptake rates associated with deprivation intervals between 0 and 90 seconds increased much more rapidly with deprivation interval than did the oxygen uptake rates associated with deprivation intervals from 120 to 300 seconds. The slope of the oxygen uptake rate versus wearing time function associated with contact lens wearing times between 120 to 300 seconds was not significantly different from zero. After 300 seconds of static PMMA contact lens wearing, the oxygen uptake rate was 6.32 times that of the normal open eye. Measurement of corneal oxygen uptake in 30 second intervals following contact lens removal showed a steady return to baseline values, so that by 300 seconds following lens wearing, the oxygen uptake rates were not significantly different from the baseline values.

Past studies have shown that contact lens material and design can influence the corneal oxygen uptake rates measured after static wearing of contact lenses. Contact lenses fitted to parallel the corneal curvature result in the greatest central corneal oxygen debt after short periods of static lens wearing, compared to steeper and flatter fits. Lenses shorter in radius of curvature (steeper) provide for a volume of tears between the contact lens and central cornea, whereas lenses with longer curvature radii (flatter) might result in slight movement or decentering that could provide oxygenated tears from the annulus of tears in the lens periphery. At least three separate studies, using the PMMA material, have demonstrated the influence of lens diameter on the corneal oxygen uptake rates measured after the static wearing of contact lenses. In one study, overall diameter varied from 8.2 to 9.4 mm in 0.3-mm steps. Optic zone diameter was 1.4 mm smaller than the overall diameter, so as to maintain a constant peripheral curve width. The increase in sagittal depth resulted in steeper fitting lenses, increased tear pooling, and reduction in post-exposure corneal oxygen uptake rates.

In a second study, the optic zone diameter was held constant at 7.4 mm, whereas overall diameter varied from 8.2 to 10.0 mm in 0.3 mm steps. Post-exposure corneal oxygen uptake rates were not significantly different among these designs, because the volume of tears over the central cornea remained constant. In the third study, a constant tear layer thickness was maintained as overall and optic zone diameters varied (from 7.6 to 10.6 mm for overall diameter, with optic zone diameter being 1.4 mm smaller) by varying the base curve radius. The two smallest lenses were associated with significantly lower oxygen uptake rates than those obtained with the two largest lenses, indicating that central corneal oxygen demand can increase as more of the cornea is covered. Other studies have shown that changes in axial edge lift and contact lens power, while keeping all other parameters constant, do not affect corneal oxygenation under the static wearing of non-gas-permeable contact lenses.

Several studies have demonstrated that increasing the oxygen transmissibility of contact lenses will result in reduction in post-exposure corneal oxygen uptake rates. Lens material also influences the oxygen supply to the cornea. Increasing material permeability (Dk) or decreasing lens thickness (t) will increase lens transmissibility (Dk/t) and oxygen supply to the cornea. While lenses of the same calculated Dk/t values, but of different Dk and t combinations should evoke the same corneal oxygen uptake response, it has been shown that this does not necessarily happen.

It has been reported that, when a gas permeable hydrophilic contact lens is sandwiched between the cornea and an impermeable PMMA lens, the oxygen dissolved in the hydrogel lens serves as a reservoir of oxygen to the cornea during periods of oxygen deprivation. The cornea can draw dissolved oxygen from the contact lens for a few minutes, until the oxygen supply in the lens is exhausted. It is possible to detect this reservoir effect in both hydrogel and rigid gas permeable lenses. Thick, high Dk rigid gas permeable lenses result in less change in corneal oxygen uptake (compared to the non-lens-wearing eye) than did thin, lower Dk lenses of the same Dk/t.

Holden and Mertz generated criteria for minimum oxygen transmissibility for maintenance of normal corneal physiology for wearing contact lenses with an open eye (daily wear) and for wearing lenses with normal overnight periods of sleep (extended wear or continuous wear).

Holden and Mertz studied the critical oxygen levels to avoid corneal edema and defined them in terms of oxygen transmissibility and equivalent oxygen percentage. The relationship between corneal edema and hydrogel lens oxygen transmissibility was examined for both daily and extended contact lens wear by measuring the corneal swelling response induced by a variety of contact lenses over a 36 hour wearing period. The relationships derived enabled average edema levels that occur with daily and extended wear in a population of normal young adults to be predicted to within ±1.0%. The critical lens oxygen transmissibility required to avoid edema for daily and extended contact lens wear were obtained from the derived curves. Holden and Mertz found under daily wear conditions that lenses having an oxygen transmissibility of at least $24.1 \pm 2.7 \times 10^{-9}$ (cm×ml $O_2$)/(sec×ml×mmHg), an Equivalent Oxygen Percentage (EOP) of 9.9%, did not induce corneal edema. The critical hydrogel lens oxygen transmissibility needed to limit overnight corneal edema to 4% (the level experienced without a contact lens in place) was found to be $87.0 \pm 3.3 \times 10^{-9}$ (cm×ml $O_2$)/(sec×ml×mmHg), an EOP of 17.9%.

Soft hydrophilic materials were developed about a decade before the first gas permeable rigid materials. The first soft hydrophilic materials had low oxygen permeability (poly-2hydroxyethyl methacrylate). The gas permeability of conventional hydrogel materials was increased over the next three decades primarily by increasing water content. Lenses were classified as having low or high water content and whether the materials were ionic or non-ionic. The polymers fell into four classes. It was generally understood that ionic polymers of negative charge demonstrated higher rates of deposition. Further, it was understood that high water lenses demonstrated a greater tendency for corneal staining. One explanation is a possible higher rate of loss of water content. Increased thickness intended to control the loss of water from the lens was incorporated and observations of reduced corneal staining were reported.

Silicone hydrogel materials were developed during the 1990's in an effort to significantly increase the gas permeability of soft contact lenses with the hope that increased oxygen transmissibility would result in a reduction of adverse events and an increase in comfort and positive overall user experience. The water content of popular materials ranged from approximately 25% to as high as approximately 75%. These materials are relatively hydrophobic and surface modification in the form of plasma treatment improved their in vitro and in vivo surface wetting. Silicone hydrogel lenses constitute the majority of new contact lens prescriptions, with conventional hydrogel making up a significant portion of new contact lens prescriptions as well. Hybrid contact lenses having a rigid gas permeable center and a soft annular skirt, as well as rigid corneal and scleral lenses, each make up a very small portion of new contact lens prescriptions.

The oxygen permeability (Dk) of silicone hydrogel materials ranges from approximately $50 \times 10^{-11}$ ($cm^2$/sec) (mL $O_2$)/(mL×mm Hg) to approximately $180 \times 10^{-11}$ ($cm^2$/sec) (mL $O_2$)/(mL×mm Hg). Some market leading lenses are designed with harmonic thicknesses in the range of 0.12 to 0.18 mm. A modal lens with commercial success has a Dk/t of greater than $80 \times 10^{-9}$ (cm×ml $O_2$)/(sec×ml×mmHg). Efforts are made to keep a thin lens profile to allow for optimum oxygen transmissibility.

During the late 1970's, Dow Corning developed silicone elastomer soft lenses using polydimethylsiloxane (PDMS) having a water content of approximately 0.2%. Dow Corning of Midland, Mich. marketed the Silsoft® (elastofilcon A) contact lens for adult aphakia for up to 30 days of wear in early 1982. The lens material had been approved by FDA in July 1981 for daily wear and Aphakic Extended wear in September 1981. The lens had an oxygen permeability (Dk) of about $340 \times 10^{-11}$ ($cm^2$/sec) (mL $O_2$)/(mL×mm Hg). Silicone elastomer lenses were cast molded and then plasma treated to obtain surface wettability.

This silicone elastomer material was also sold under the brand name Silsight and was introduced for 30 day extended wear for non-aphakic refractive error correction. Silsight lenses were used for daily or extended wear and had a reported five percent rate of corneal adherence, a long referred to risk with silicone elastomer lenses. Ninety eight percent of 616 patients were reported to have 20/25 or better visual acuity with this lens. It was reported that there were no significant changes in corneal physiology with the elastifilcon A lens used for extended wear in myopic patients in over 400 patients. Previous silicone elastomer lenses in Germany and Japan had reported eight to twenty-two percent non-movement or adherence. Other side effects reported with these lenses included occasional and random hydrophobicity, which would blur vision but not irritate the eye. A lens made of this material with improved manufacturing was, according to this report, likely to allow excellent corneal health and very good vision compared to hydrogel lenses.

Recently, The Infant Aphakic Treatment Study, sponsored by the National Eye Institute and National Institutes of Health (NIH), was completed with one year and then five year follow-up. The Silicone Elastomer contact lenses were worn successfully with relatively few adverse events by a cohort of infants with unilateral aphakia. There were significantly more adverse events and additional intraoperative procedures in the intraocular lens (IOL) group. None of the contact lens—related adverse events resulted in central corneal scars that were judged to permanently affect visual acuity. These results indicate, under very difficult conditions, the safety and efficacy of the silicone elastomer contact lens.

The investigators concluded that when weighing whether to operate on an infant younger than 7 months of age with a unilateral cataract, it was recommended to leave the eye aphakic and to correct the focusing error of the eye with a contact lens. They added that, primary IOL implantation should be reserved for those infants where, in the opinion of the surgeon, the cost and handling of a contact lens would be so burdensome as to result in significant periods of uncorrected aphakia.

Silicone elastomer (such as polydimethylsiloxane, or PDMS) is an ideal material for embedded components. The PDMS material is reported to be used in the SENSIMED Triggerfish contact lens, which has a strain gauge and sending unit implanted in the lens to measure intraocular pressure. The components are in the periphery of the lens and represent minimal interference with oxygen transmissibility. The high oxygen permeability of PDMS is ideal for supporting corneal physiology. Modern surface modification is expected to reduce the hydrophobicity of the earlier PDMS lenses. Further, PDMS formulation and curing process has been tested and found to be non-cytotoxic, non-systemic toxic, and a non-ocular irritant.

The use of ultra-high oxygen permeable materials presents a paradoxical opportunity to increase thickness of a layer beneath a low or non-gas permeable component to increase the equivalent oxygen percentage to the surface of the cornea covered by the component. Conventional practice as aforementioned constructs lenses thinner to increase oxygen transmissibility since the formula for transmissibility is the permeability divided by the thickness. If this practice were applied to a layer posterior to a low or non-gas permeable component, the oxygen percentage beneath the component would decrease. Nine percent (9%) is established as the minimum for open eye or daily wearing for particular embodiments of the present invention.

There are references that disclose layered lens constructions that include a cavity or chamber for retaining a component, a fluid or a gel. The oxygen permeability of the previously taught aqueous solutions is substantially lower than that of the polymers intended for the embodiments of the present disclosure. While some of the prior art references have merit for delivering oxygen, the complexity of fabricating lenses described by the art is far more challenging. Biocompatibility and management of the integrity of the aqueous or gel filled cavities is also troublesome.

The prior art has also taught an air cavity with an anterior gas permeable layer at its periphery and an underlying posterior gas permeable layer intended to deliver oxygen to the underlying eye in the presence of non-gas permeable component anterior to the cavity. However, these references fail to teach the modulation of the thickness of a polymer layer alone for the purpose of delivering a desired equivalent oxygen percentage to a predetermined location on the corneal surface.

Reports of the inclusion of elements or components into contact lenses have been made in recent years. These elements include filters, light emitting diodes (LED), light sources, sensors, strain gauges, processors, sending units, wires and batteries. The reports include the use of graphene for night vision display applications. In many cases, like the use of graphene, titanium pin-hole apertures, low gas permeable polarizer filters, LED and organic LED (OLED) arrays, and dielectric stack filters, the respective elements or components are not gas permeable or demonstrate low permeability. Thus, there has existed a need for a device, system and method for incorporating the at least one element or component which has an oxygen permeability lower than the material of the lens body in contact lenses and at the same time deliver oxygen to the eye in the region covered by the at least one element or component which has an oxygen permeability lower than the material of the lens body.

SUMMARY OF THE INVENTION

The current invention provides just such a solution by having contact lenses, methods and systems for accomplishing the requirement for biocompatibility of oxygen delivery to the eye and the cornea in particular when components, also referred to as elements, are used which reduce the transmissibility of oxygen and which require coverage of a significant area of the non-vascularized cornea.

In one embodiment, a contact lens assembly is provided, comprising: an anterior surface, a posterior surface and at least one element or component having a substantially low oxygen permeability disposed within the lens. The contact lens also includes a layer having an oxygen permeability greater than the aforementioned element or component. The thickness of this layer is such that the layer provides an equivalent oxygen percentage to the cornea beneath the aforementioned element or component.

It is an object of the invention to provide a contact lens with a thickness of the material beneath the low or non-gas permeable component to increase the equivalent oxygen percentage to the corneal surface beneath the component It is another object of the invention to provide a method for making a contact lens with an optimum thickness of a layer of material beneath a low or non-gas permeable component such that a minimum requirement of oxygen delivery for the physiologic requirements of the cornea is met.

It is a further object of this invention to provide an improved contact lens and method for making the same that incorporates a low or non-gas permeable component while providing the minimum requirement of oxygen delivery for the physiologic requirements of the cornea.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The following references are considered pertinent to the current disclosure, and their entireties are incorporated herein by reference:

Kennedy R H, Bourne W M, Dyer J A. A 48-year clinical and epidemiologic study of keratoconus. Am J Ophthalmol 1986; 101:267-273.

Korb D R, Finnemore V M, Herman J P. Apical changes and scarring in keratoconus as related to contact lens fitting techniques. Journal of the American Optometric Association 1982; 53:199-205.

Maguen E, Espinosa G, Rosner I R, Newburn A B. Long-term wear of Polycon contact lenses in keratoconus. The CLAO Journal 1983; 9:57-59.

Drews M J, Driebe W T, Stern G A. The clinical management of keratoconus: a 6-year retrospective study. CLAO J 1994; 20:194-197.

Smiddy W E, Hamburg T R, Kracher G P, Stark W J. Keratoconus: contact lens or keratoplasty? Ophthalmology 1988; 96:487-492.

Westerhout D. The combination lens. Contact Lens 1973; 4(5):3-9.

Baldone J A. The fitting of hard lenses onto soft contact lenses in certain diseased conditions. Contact Lens Med Bull 1973; 6(2-3):15-17.

Weissman B A. An old-new piggyback fit. Contact Lens Forum 1982; 7(3):71-73.

Brennan N A. Current thoughts on the etiology of ocular changes during contact lens wear. Australian J Optom 1985; 68(1):8-24.

Hill R M, Fatt I. Oxygen uptake from a reservoir of limited volume of the human cornea in vivo. Science 1963; 142:1295-1297.

Hill R M. Cuklanz H. Oxygen transmissivity of membranes in contact with the cornea: physiological observations. Br J Physiol Optics 1967; 24(3):206-216.

Fink B A, Smith B J, Hill R M. Oxygen depletion characteristic of in vivo human cornea [ARVO Abstract]. Invest Ophthalmol Vis Sci 1995; 36(4):5310.

Hill R M, Fatt I. Oxygen deprivation of the cornea by contact lenses and lid closure. Am J Optom Amer Acad Optom 1964; 41(11):678-687.

Fink B A, Hill R M, Carney L G. Influence of rigid contact lens base curve radius on tear pump efficiency. Optom Vis Sci 1992; 69:60-5.

Fink B A, Hill R M, Carney L G. Influence of rigid contact lens overall and optic zone diameters on tear pump efficiency. Optom Vis Sci 1990; 67:641-4.

Fink B A, Carney L G, Hill R M. Rigid contact lens design: effects of overall diameter changes on tear pump efficiency. Optom Vis Sci 1991; 68:198-203.

Fink B A, Carney L G, Hill R M. Rigid lens tear pump efficiency: effects of overall diameter/base curve combinations. Optom Vis Sci 1991; 68:309-313.

Fink B A, Hill R M, Carney L G. Effects of rigid contact lens edge lift changes on tear pump efficiency. Optom Vis Sci 1991; 68:409-13.

Fink B A, Carney L G, Hill R M. Influence of power changes in single cut rigid contact lenses on tear pump efficiency. Optom Vis Sci 1992; 69:691-7.

Hill R M, Szczotka L B. Hypoxic stress units: another look at oxygen performance of RGP lenses on the cornea. Contact Lens Spectrum 1991; 6(4):31-3.

Ostrem E D, Fink B A, Hill R M. Contact lens transmissibility: effects on delivery of oxygen to the cornea. Optom Vis Sci 1996; 73:159-63.

Fink B A, Hill R M, Smith B, Szczotka L, Barr J T. RGP materials that reduce hypoxic stress: Part II. Contact Lens Spectrum 1992; 7(4):20-1.

Hill R M. Aqualunging: or the lens reservoir effect. Inter Contact Lens Clin 1981; 8(6):30-35.

Fink B A, Hill R M, Pappas C. Dk/L: effect on the post-lens reservoir [ARVO Abstract]. Invest Ophthalmol Vis Sci 1999; 40(4):5906. Abstract #4775.

Holden B A, Mertz G W. Critical oxygen levels to avoid corneal edema and daily and extended wear contact lenses Invest Ophthalmol Vis Sci 25:1161-1167, 1984

TRIAL REGISTRATION, clinicaltrials.gov, Identifier: NCT00212134

A particular embodiment of the current disclosure is a contact lens comprising an anterior surface facing away from an eye; a posterior surface facing toward the eye; a medium residing between the anterior surface and the posterior surface, where the medium has an oxygen permeability; a component, where the component has an oxygen permeability lower than the oxygen permeability of the medium; and a layer between the component and the posterior surface, where the layer comprises a material with a thickness, where the thickness of the material of the layer is sufficient to deliver an oxygen percentage to a location on the surface of the cornea, where the material of the layer is contiguous with the medium residing between the anterior surface and the posterior surface.

Another embodiment of the current disclosure is a method of determining a thickness of a polymer layer of a contact lens, where the lens comprises an anterior surface facing away from an eye; a posterior surface facing toward the eye; a medium residing between the anterior surface and the posterior surface, where the medium has an oxygen permeability; a component, where the component has an oxygen permeability; and the polymer layer, where the polymer layer has an oxygen permeability; the method comprising the step of: determining an area of a cornea covered by the component; calculating the thickness of the polymer layer using the oxygen permeability of the polymer layer, the area of the cornea covered by the component, the oxygen permeability of the component; the oxygen permeability of the medium; and a desired oxygen percentage to be delivered to a desired location on the corneal surface.

A further embodiment of the current disclosure is a contact lens comprised of: a lens body having an anterior surface facing away from an eye and a posterior surface facing toward an eye, where the lens body comprises a medium between the anterior surface and a posterior surface; one or more components within the medium, where the one or more components have an oxygen permeability lower than the medium of the lens body; and a polymer layer between the one or more components and the posterior surface; wherein, the polymer layer has a thickness sufficient to deliver a pre-determined oxygen percentage to a pre-determined location on the surface of a cornea and is contiguous with the medium of the lens body that proceeds in an anterior direction to the anterior surface of the lens body.

Yet another embodiment of the current disclosure is a method of determining a thickness of a polymer layer of a contact lens having: a lens body having an anterior surface facing away from an eye and a posterior surface facing toward an eye, where the lens body comprises a medium between the anterior surface and a posterior surface; where the lens body further comprises a component which has an oxygen permeability lower than the medium of the lens body; and where the lens body further comprises a polymer layer between the component and the posterior surface, where the polymer layer has an oxygen permeability; wherein, the thickness of the polymer layer is mathematically calculated using the oxygen permeability of the polymer layer, the area of a cornea covered by the component, an oxygen transmission through the component, an oxygen transmissibility of the lens body surrounding the components and a predetermined oxygen percentage to be delivered to a pre-determined location on the surface of the cornea.

An additional embodiment of the current disclosure is a contact lens comprised of: an anterior surface facing away from an eye; a posterior surface facing toward an eye; a lens body containing the anterior and posterior surface and a medium between; one or more components which have oxygen permeabilities lower than the medium of the lens body and where the one or more components have a surface area of greater than 3 $mm^2$; and, a polymer layer between the one or more components and the posterior surface; wherein, the polymer layer has an oxygen permeability of $100 \times 10$-11 ($cm^2$/sec) (mL $O_2$)/(mL×mm Hg) or greater and a thickness sufficient to deliver an oxygen percentage of nine percent or greater to the center of an anterior corneal surface covered by the components.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention. The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

Figure 1:
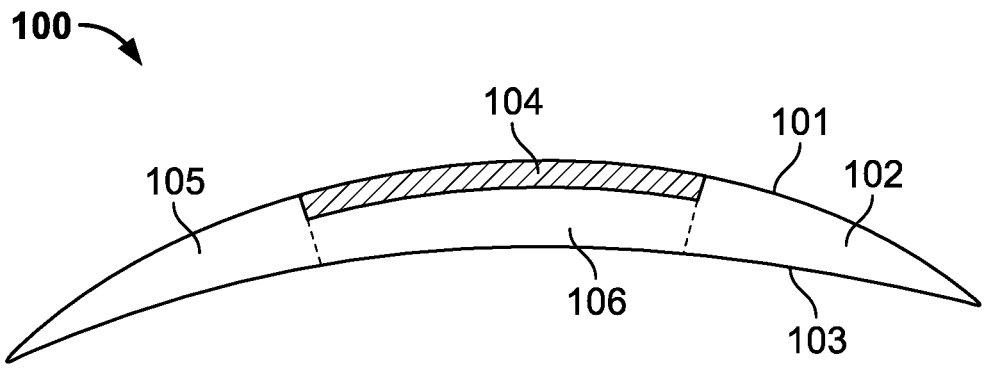
FIG. 1 is a cross-sectional view of a contact lens with a lens filter at the anterior surface of the lens, in accordance with selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

Selected embodiments of the current disclosure include a contact lens having an anterior surface away from the eye and a posterior surface facing the eye and a lens body bordered by the anterior and posterior surface. The contact lens is generally described as a low modulus lens (soft); even so the invention is applicable to a high modulus lens (rigid) or a lens having both rigid and soft materials (hybrid). The posterior surface is generally related in geometry to the ocular contour of the eye but may deviate in its shape from representing the ocular contour of the eye. The central geometry of the anterior surface of the lens is generally selected to produce the desired refractive correction for the eye but could be a secondary element in providing the refractive correction if lenslets or apertures within the lens or other means are used to produce the refractive correction.

The body of the lens is defined as one or more lens substrate materials between or including the anterior surface and the posterior surface in the present invention. The lens body contains one or more components which have an oxygen permeability lower than the material posterior to them. The components can be on the anterior surface and/or within the body of the lens. Portions of the components may be at different sagittal depths on or within the body of the lens.

Selected embodiments of the current invention provide for the use of a layer of the lens polymer of the lens body or a second lens polymer posterior to at least one element or component that has an oxygen permeability lower than the material, or medium, posterior to them. The material posterior to the respective components serves to deliver oxygen by way of the oxygen transmission through the exposed anterior surface and lens body above the posterior layer and the thickness of the material of the posterior layer. The thickness of the polymer posterior to the components which have an oxygen permeability lower than the material posterior to them is a function of the oxygen permeability of the polymer beneath the components; the surface area of the components covering the cornea; the oxygen transmissibility of the components covering the cornea; and, the targeted equivalent oxygen percentage to be delivered to a predetermined location of the cornea.

The thickness of the polymer layer is generally greater the lower the permeability of the material posterior to the components and the larger the area of the components which have an oxygen permeability lower than the material posterior to the components. Conversely, the thickness of the polymer layer is generally lesser the greater the permeability of the material posterior to the components and the smaller the area of the components which have an oxygen permeability lower than the material posterior to the components.

Particular aspects of the current disclosure provide for increasing the lens thickness to increase the equivalent oxygen percentage delivered to the cornea covered by an element or component having low or no oxygen transmissibility. The traditional practice taught in prior art is to decrease thickness to increase oxygen transmissibility. Materials having a sufficiently high oxygen permeability may be used with increased thickness to facilitate oxygen diffusion sufficient to maintain the physiological requirements of the cornea covered by at least one elements or component having limited or no oxygen permeability.

Since increasing the thickness decreases the oxygen transmissibility of the layer, the invention could not be practiced with materials having a permeability below a threshold determined by the area of the components which have an oxygen permeability lower than the material posterior to the components and the targeted equivalent oxygen percentage desired at the specified location on the corneal surface. For example, a material having a substantially low permeability and a component area covering a substantially large area of the cornea could not be made at any thickness to deliver the Holden Mertz minimum oxygen transmissibility for healthy daily wear contact lenses. Particular embodiments of the current disclosure are directed to contact lenses having a posterior layer having a permeability substantially high to allow for increasing its thickness to provide a layer for oxygen delivery. The use of materials having a permeability of greater than Dk=100×10' $(cm^2/sec)$ $(mL\ O_2)/(mL \times mm\ Hg)$ is at least substantially high enough to allow for such an increase in thickness to provide a layer for oxygen delivery.

The Holden Mertz criteria speak to an oxygen transmissibility that produces a minimum of corneal swelling from hypoxia (low oxygen delivery). A mathematical model may also use a percentage of oxygen in the gas arriving at the corneal surface as a metric for determining the appropriate thickness of the layer posterior to the component within a contact lens. Hence, the third variable is the targeted equivalent oxygen percentage to a defined location on the anterior cornea. Holden and Mertz defined the equivalent oxygen percentage for daily wear as 9.9% with a range of +/− 1% as the standard error of the estimate. Particular embodiments of the current disclosure use a target minimum equivalent oxygen percentage of 9%.

One embodiment of the present disclosure is a contact lens made of a single polymer polydimethylsiloxane and having a round polarizer filter that is 7 mm in diameter which has no gas permeability. The full surface area of the polarizer covers the cornea. The Dk of the PDMS is measured to be $340 \times 10^{-11}$ $(cm^2/sec)$ $(mL\ O_2)/(mL \times mm\ Hg)$. The defined oxygen percentage to the cornea posterior to the center of the non-gas permeable filter is 9%. One mathematical model for calculating the percentage of oxygen to reach the distance to the center as a function of the thickness and Dk is:

$$EOP = -\frac{1187}{D_k}\ln\left(\frac{D_k}{t}\right) + \frac{140}{\sqrt{area}}$$

For this embodiment, the filter has an oxygen transmissibility of zero, or a filter Dk/t of $0.0 \times 10^{-9}$ $(cm \times mL\ O_2)/(sec \times mL \times mmHg)$. The filter diameter is 7 mm (38.48 $mm^2$); and the equivalent oxygen percentage target for the cornea under the center of the circular filter element is 9%. In this case the thickness of the polymer layer having a Dk=340× $10^{-11}$ $(cm^2/sec)$ $(mL\ O_2)/(mL \times mm\ Hg)$, and under the geometric center of the filter described above is calculated to be, 0.700 mm.

It is to be understood by those skilled in the art that other mathematical models could be used to define the relationship between the oxygen permeability of at least one element, the area covered by the element, the oxygen reaching the layer beneath the element, the permeability of the layer beneath the element, and the equivalent oxygen percentage desired at a defined location.

Additional embodiments of the current disclosure include multiple elements or components that are non-gas permeable or having at least one element with gas permeability lower than the layer posterior to these components. Other embodiments include components with spaces, fenestrations or channels for the purpose of increasing their oxygen transmission. Further embodiments include multiple components with spaces between the components. In such embodiments, the average oxygen transmissibility is expected to exceed the transmissibility of the component with the lowest permeability. In the respective embodiments, the thickness of the layer posterior to the elements or components is modulated to produce the targeted oxygen percentage to the specified area of the corneal surface.

Selected embodiments of the current disclosure utilize one or more polymer layers posterior to at least one element or component having an oxygen permeability lower than the material of the body of the lens containing the element or component. The one or more layers can be configured in thickness and position for the purpose of delivering a predetermined equivalent oxygen percentage to one or more locations in the underlying cornea.

Referring now to the figures, FIG. 1 depicts a component containing contact lens 100 in accordance with selected embodiments of the current disclosure. The component containing contact lens 100 has an anterior surface 101, a lens body 102, and a posterior surface 103. The component containing contact lens 100 comprises a component 104, generally peripheral lens areas 105, which circumferentially surrounds the lens component 104, and a layer 106, which is posterior to the component 104 and contiguous with the peripheral areas 105.

With continued reference to FIG. 1, the component 104 is constructed at the anterior surface of the contact lens 100 and the lens body 103 includes a layer 106 posterior to the component 104. As will be understood by those of skill in the art, the component 104 is not limited to a location at the anterior surface, to a symmetrical configuration, or to a uniform thickness profile, or to a centered position relative to the geometric center of the contact lens 100. For example, additional elements or a deeper placement of the element may be employed, or a regional placement may be employed. In this manner, the lens can be customized for the inclusion of a number and variety of elements or components and the thickness of the posterior layer can be determined to provide a desired equivalent oxygen percentage to the surface of the cornea covered by the elements or components.

Figure 2:
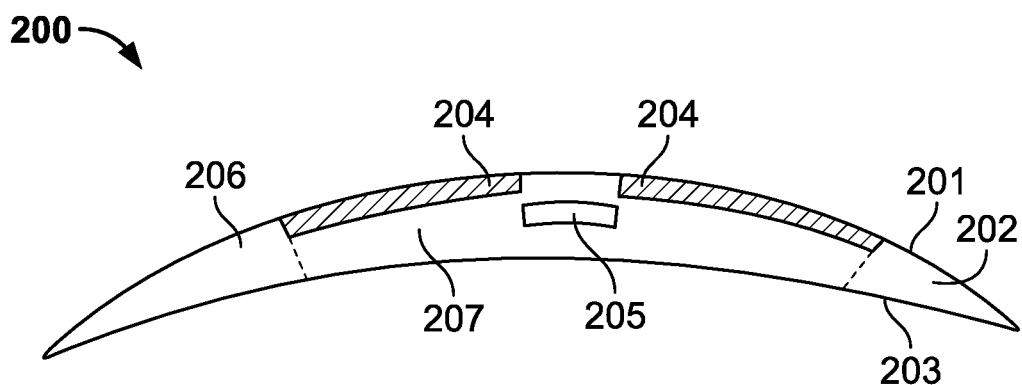
FIG. 2 is a cross-sectional view of a contact lens with two components at different sagittal depths in accordance with selected embodiments of the current disclosure.

FIG. 2 depicts a component containing contact lens 200 in accordance with selected embodiments of the current disclosure. The component containing contact lens 200 has an anterior surface 201, a lens body 202, and a posterior surface 203. The component containing contact lens 200 comprises a first component 204 which is a circular component with a central hole or space, a second component 205 at a different sagittal depth than the first component 204, generally peripheral lens areas 206 which circumferentially surrounds the lens components 204 and 205, and a layer 207, which is posterior to the components 204 and 205 and contiguous with the peripheral areas 206.

Figure 3:
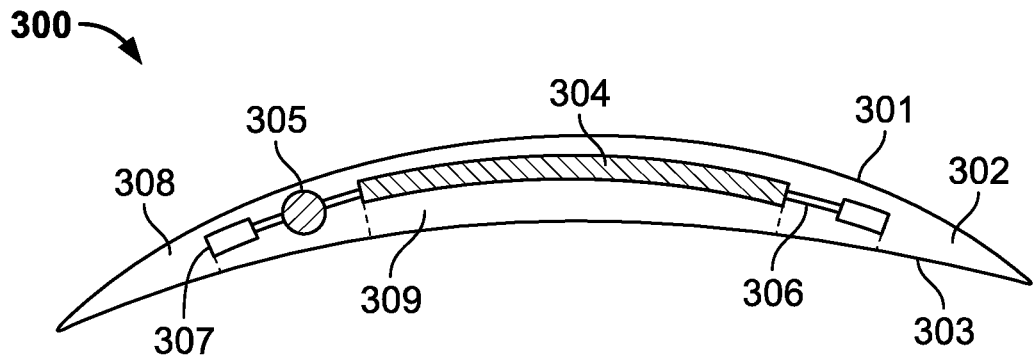
FIG. 3 is a cross-sectional view of a contact lens with multiple components at different sagittal depths in accordance with selected embodiments of the current disclosure.

With continued reference to FIG. 2, the component 204 is constructed at the anterior surface of the contact lens 200 and a second component 205 is deeper in the lens body 202. The lens body 202 includes a layer 207, which is posterior to the components 204 and 205. As will be understood by those of skill in the art, the components 204 and 205 are not limited to locations at the anterior surface or the apparent relative depths in the lens body 202, to a symmetrical configuration, or to a uniform thickness profile, or to a centered position relative to the geometric center of the contact lens 200. For example, additional elements or a deeper placement of the element may be employed, or a regional placement may be employed. In this manner, the lens can be customized for the inclusion of a number and variety of elements or components and the thickness of the posterior layer can be determined to provide a desired equivalent oxygen percentage to the surface of the cornea covered by these elements or components FIG. 3 depicts a component containing contact lens 300 in accordance with selected embodiments of the current disclosure. The component containing contact lens 300 has an anterior surface 301, a lens body 302, and a posterior surface 303. The component containing contact lens 300 includes a first component 304, which is a first electronic component, a second component 305, which is a second electronic component at a different sagittal depth than the first component 304, a third component 306, which is a wire, a fourth component 307 depicting a third electronic component at a different sagittal depth than the first component 304, generally peripheral lens areas 308, which circumferentially surrounds the lens components 304, 305, 306 and 307, and a layer 309, which is posterior to the components 304, 305, 306 and 307 and contiguous with the peripheral lens areas 308

With continued reference to FIG. 3, the components 304, 305, 306 and 307 are depicted as having various relative dimensions and constructed in the lens body 302 at various depths The lens body 302 includes a layer 308 which is posterior to the components 304, 305, 306 and 307. As will be understood by those of skill in the art, the components 304, 305, 306 and 307 are not limited to locations at the apparent relative depths in the lens body 302, to a symmetrical configuration, or to a uniform thickness profile, or to a centered position relative to the geometric center of the contact lens 300. For example, additional components or a deeper placement of the components may be employed, or a regional placement may be employed. In this manner, the lens can be customized for the inclusion of a number and variety of elements or components and the thickness of the posterior layer can be determined to provide a desired equivalent oxygen percentage to the surface of the cornea covered by these elements or components.

Figure 4:
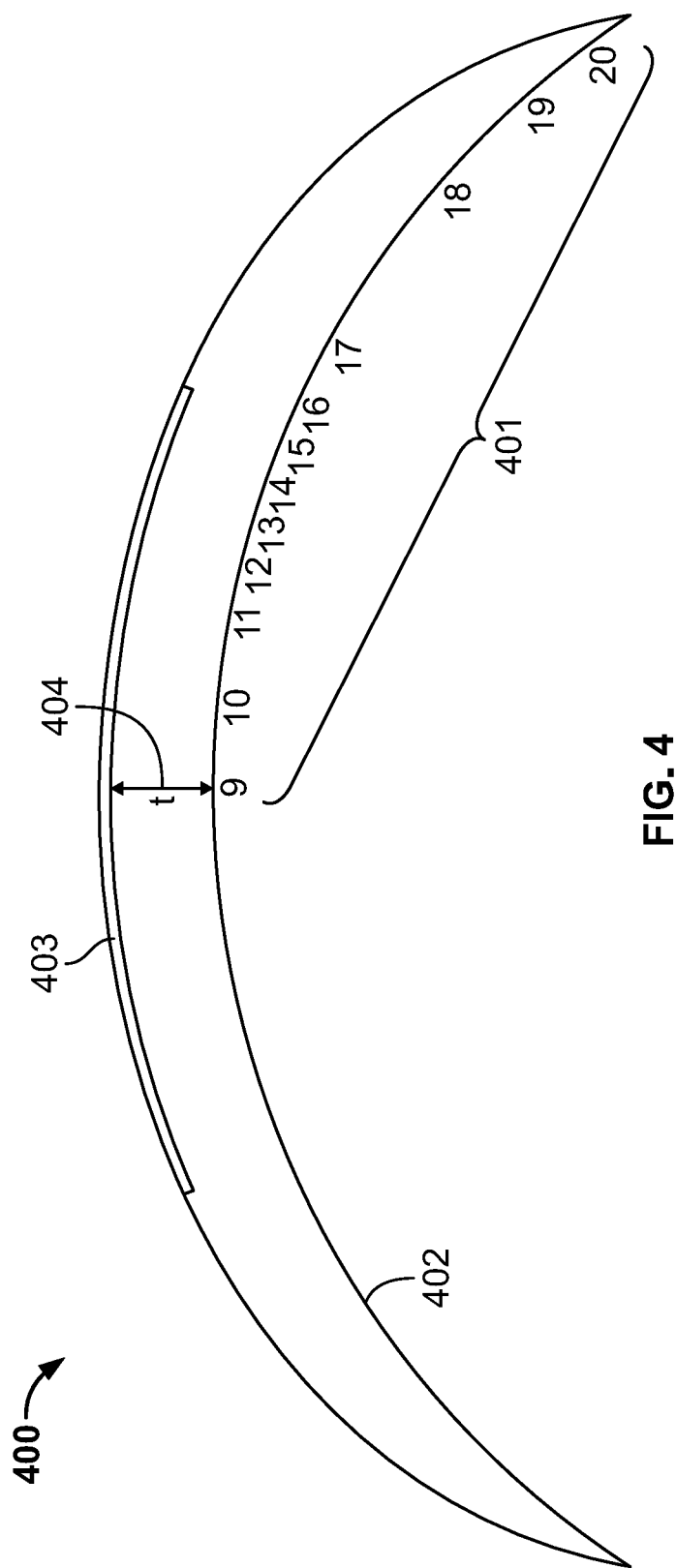
FIG. 4 is an iso-line drawing of the equivalent oxygen percentage values at the posterior surface of a contact lens having one component with a limited oxygen transmissibility and with a surface area defined by its dimensions and with a posterior polymer layer with an oxygen permeability and a thickness designed to deliver a minimum equivalent oxygen permeability in accordance with selected embodiments of the current disclosure.

FIG. 4 is an iso-line drawing of the equivalent oxygen percentage values at the posterior surface of a contact lens having one component with a limited oxygen transmissibility and with a surface area defined by its dimensions and with a posterior polymer layer with an oxygen permeability and a thickness designed to deliver a minimum equivalent oxygen permeability in accordance with selected embodiments of the current disclosure. Contact lens 400 is shown with iso-lines of equivalent oxygen percentage (EOP) values 401, at the posterior surface 402 of a lens having one component 403 with a limited oxygen transmissibility and of a surface area defined by its dimensions and with a posterior polymer layer with an oxygen permeability and a thickness (t) 404 to deliver a minimum equivalent oxygen permeability of 9%.

Figure 5:
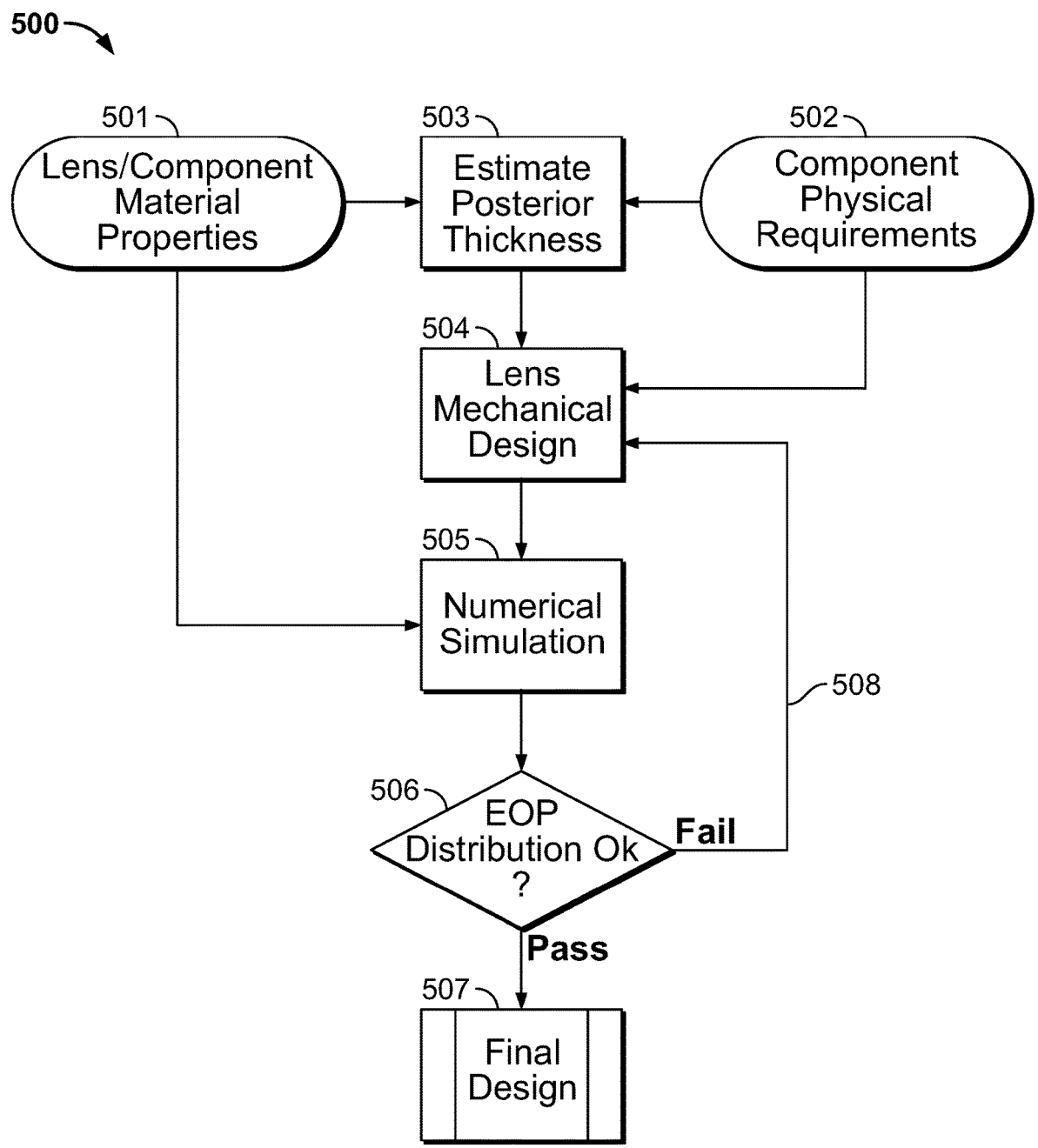
FIG. 5 is a flow chart for determining the thickness of a polymer layer posterior to at least one component in the lens body of a contact lens for the purpose of delivering a predetermined equivalent oxygen percentage to a predetermined location on the corneal surface in accordance with selected embodiments of the current disclosure.

FIG. 5 depicts a flow chart or process 500 for determining the thickness of a polymer layer posterior to at least one component in the lens body of a contact lens for the purpose of delivering a predetermined equivalent oxygen percentage to a predetermined location on the corneal surface. The process 500 starts by using the lens and component material properties 501 and the characterization of the component physical requirements 502 to estimate the thickness of the layer posterior to the at least one component of the present invention 503. For example, the component material properties 501 include oxygen permeability, elastic modulus, refractive index, and spectral characteristics. Continuing with the example, component physical requirements 502 include effective optical diameter, thickness, surface area, and sphericity. While the estimation of posterior thickness 503 could be a randomly guessed thickness, previous numerical simulations and final designs of lenses can be used as a guide for estimating posterior thickness. Once the posterior thickness has been estimated, the component physical requirements 502 and the estimated posterior thickness 503 are applied in the process of the mechanical design 504 of the lens to produce a design of a lens that includes, for example, the optical zone diameter, outside diameter, edge thickness, center thickness, and other design criteria. In turn, the lens and component material properties 501 and the mechanical design of the lens 504 are integrated into the mathematical calculation or numerical simulation 505 to determine a resultant equivalent oxygen percentage across the posterior surface of the lens. The calculated equivalent oxygen percentage across the posterior surface of the lens is compared 506 to the targeted requirement. A successful passing, for example the resulting or calculated equivalent oxygen percentage across the posterior surface of the lens is greater than a targeted requirement or within a targeted range, advances the process to a final design 507. Failure 508 to meet the targeted equivalent oxygen percentage returns the process to lens mechanical design 504 and reintegration of component material properties 501, including varying the posterior thickness to be larger or smaller to exceed the targeted requirement or fall within a target range. For example, should the resulting equivalent oxygen percentage fall below a targeted requirement of 9%, the mechanical design of the lens is modified to increase the posterior thickness and a numerical simulation is performed again on the revised design to determine a resulting equivalent oxygen percentage across the posterior surface of the lens.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments That which is claimed:

1. A contact lens comprising
an anterior surface;
an opposing posterior surface;
a low or non-gas permeable component residing between the anterior surface and the posterior surface; and
a polymer layer between the component and the posterior surface, where the polymer layer has a thickness and an oxygen permeability of $100 \times 10^{-11}$ $(cm^2/sec)$ $(mL\ O_2)/(mL \times mm\ Hg)$ or greater;
where the component has an oxygen permeability lower than the oxygen permeability of the polymer layer;
where the thickness of the polymer layer is sufficient to deliver an equivalent oxygen percentage of nine percent or greater to a location on a corneal surface.

2. The contact lens of claim 1, where the thickness of the polymer layer is proportional to the oxygen permeability of the polymer layer, an area of the corneal surface covered by the component, and the equivalent oxygen percentage required at the location on the corneal surface.

3. The contact lens of claim 1, where the polymer layer consists of a single polymer material.

4. The contact lens of claim 1, wherein the oxygen permeability of the component is zero.

5. The contact lens of claim 1, wherein the component has a surface area greater than $38.48\ mm^2$.

6. The contact lens of claim 1, wherein the component has a surface area greater than $7.1\ mm^2$.

7. The contact lens of claim 1, further comprising a second component, where the second component has an oxygen permeability lower than the oxygen permeability of the polymer layer.

8. The contact lens of claim 1, wherein the thickness of the polymer layer is 0.7 mm.

9. A method of determining a thickness of a polymer layer of a contact lens, where the lens comprises an anterior surface; an opposing posterior surface; a low or non-gas permeable component residing between the anterior surface and the posterior surface; and a polymer layer between the component and the posterior surface; where the polymer layer has a thickness and an oxygen permeability, where the component has an oxygen permeability lower than the oxygen permeability of the polymer layer, the method comprising the steps of:
estimating a first thickness of the polymer layer;
performing a mathematical calculation or numerical simulation using the first thickness to determine a first resulting equivalent oxygen percentage across the posterior surface;
comparing the first resulting equivalent oxygen percentage across the posterior surface to a targeted range of acceptable equivalent oxygen percentages;
estimating a second thickness that is larger than the first thickness if the first resulting equivalent oxygen percentage across the posterior surface is below the targeted range of acceptable equivalent oxygen percentages;
performing a mathematical calculation or numerical simulation using the second thickness to determine a second resulting equivalent oxygen percentage across the posterior surface;
comparing the second resulting equivalent oxygen percentage across the posterior surface to the targeted range of acceptable equivalent oxygen percentages;
estimating a third thickness that is smaller than the first thickness if the first resulting equivalent oxygen percentage across the posterior surface is above the targeted range of acceptable equivalent oxygen percentages;
performing a mathematical calculation or numerical simulation using the third thickness to determine a third resulting equivalent oxygen percentage across the posterior surface; and
comparing the third resulting equivalent oxygen percentage across the posterior surface to the targeted range of acceptable equivalent oxygen percentages.

10. The method of claim 9, wherein the polymer layer of the contact lens consists of a single polymer material.

11. The method of claim 9, wherein the oxygen permeability of the component is zero.

12. The method of claim 9, wherein the component has a surface area greater than $38.48\ mm^2$.

13. The method of claim 9, wherein the component has a surface area greater than $7.1\ mm^2$.

14. The method of claim 9, further comprising a second component, where the second component has an oxygen permeability lower than the oxygen permeability of the polymer layer.

15. A method of determining a thickness of a polymer layer of a contact lens, where the lens comprises an anterior surface; an opposing posterior surface; a low or non-gas permeable component residing between the anterior surface and the posterior surface; and a polymer layer between the component and the posterior surface; where the polymer layer has a thickness and an oxygen permeability, where the component has an oxygen permeability lower than the oxygen permeability of the polymer layer, the method comprising the steps of:
estimating a first thickness of the polymer layer;
performing a mathematical calculation or numerical simulation using the first thickness to determine a first resulting equivalent oxygen percentage across the posterior surface;
comparing the first resulting equivalent oxygen percentage across the posterior surface to a targeted range of acceptable equivalent oxygen percentages;

estimating a second thickness that is larger than the first thickness if the first resulting equivalent oxygen percentage across the posterior surface is below the targeted range of acceptable equivalent oxygen percentages;

performing a mathematical calculation or numerical simulation using the second thickness to determine a second resulting equivalent oxygen percentage across the posterior surface;

comparing the second resulting equivalent oxygen percentage across the posterior surface to the targeted range of acceptable equivalent oxygen percentages;

estimating a third thickness that is smaller than the second thickness if the second resulting equivalent oxygen percentage across the posterior surface is above the targeted range of acceptable equivalent oxygen percentages;

performing a mathematical calculation or numerical simulation using the third thickness to determine a third resulting equivalent oxygen percentage across the posterior surface; and comparing the third resulting equivalent oxygen percentage across the posterior surface to the targeted range of acceptable equivalent oxygen percentages.

16. A method of determining a thickness of a polymer layer of a contact lens, where the lens comprises an anterior surface; an opposing posterior surface; a low or non-gas permeable component residing between the anterior surface and the posterior surface; and a polymer layer between the component and the posterior surface; where the polymer layer has a thickness and an oxygen permeability, where the component has an oxygen permeability lower than the oxygen permeability of the polymer layer, the method comprising the steps of:

estimating a thickness of the polymer layer;

iterating through the following process:
  performing a mathematical calculation or numerical simulation using the thickness to determine a resulting equivalent oxygen percentage across the posterior surface;
  comparing the resulting equivalent oxygen percentage across the posterior surface to a targeted range of acceptable equivalent oxygen percentages;
  if the resulting equivalent oxygen percentage across the posterior surface is within the range of acceptable equivalent oxygen percentages, exiting the iterative process;
  if the resulting equivalent oxygen percentage across the posterior surfaces is below the range of acceptable equivalent oxygen percentages, increasing the thickness of the polymer layer and restarting the iterative process; and
  if the resulting equivalent oxygen percentage across the posterior surfaces is above the range of acceptable equivalent oxygen percentages, decreasing the thickness of the polymer layer and restarting the iterative process.

17. The method of claim 16, where the polymer layer of the contact lens consists of a single polymer.

18. The method of claim 16, wherein the oxygen permeability of the component is zero.

19. The method of claim 16, wherein the component has a surface area greater than 38.48 mm$^2$.

20. The method of claim 16, wherein the component has a surface area greater than 7.1 mm$^2$.

21. The method of claim 16, further comprising a second component, where the second component has an oxygen permeability lower than the oxygen permeability of the polymer layer.

* * * * *